United States Patent
Petit

(10) Patent No.: US 7,398,182 B2
(45) Date of Patent: Jul. 8, 2008

(54) METHOD AND DEVICE FOR DETECTING DEGRADATION OF PERFORMANCE OF AN AIRCRAFT

(75) Inventor: Gérard Petit, Toulouse (FR)

(73) Assignee: Avions de Transport Regional, Blagnac (FR)

( * ) Notice: Subject to any disclaimer, the term of this patent is extended or adjusted under 35 U.S.C. 154(b) by 7 days.

(21) Appl. No.: 11/159,424

(22) Filed: Jun. 23, 2005

(65) Prior Publication Data

US 2005/0288895 A1 Dec. 29, 2005

(30) Foreign Application Priority Data

Jun. 28, 2004 (FR) .................................. 04 07034

(51) Int. Cl.
*G06F 19/00* (2006.01)

(52) U.S. Cl. ................... 702/182; 73/170.15; 244/75.1; 244/99.12; 340/945; 340/963; 340/969; 701/1; 701/7; 701/8; 701/9; 702/127

(58) Field of Classification Search ............. 73/170.11, 73/170.15, 178 R; 244/75.1, 99.12; 340/945, 340/963, 969; 701/1, 7, 8, 9, 12; 702/127, 702/182
See application file for complete search history.

(56) References Cited

U.S. PATENT DOCUMENTS

| | | | | |
|---|---|---|---|---|
| 2,041,794 A * | 5/1936 | Stalker | ....................... | 244/208 |
| 2,452,621 A * | 11/1948 | Weissenbach | ............. | 73/178 R |
| 2,538,303 A * | 1/1951 | Findley | .................... | 73/178 R |
| 4,312,041 A * | 1/1982 | DeJonge | ..................... | 701/123 |
| 4,490,802 A * | 12/1984 | Miller | ....................... | 702/175 |
| 4,843,554 A * | 6/1989 | Middleton et al. | ............ | 701/15 |
| 5,457,630 A | 10/1995 | Palmer | ......................... | 701/3 |
| 5,457,634 A | 10/1995 | Chakravarty | ................... | 701/3 |
| 6,092,021 A * | 7/2000 | Ehlbeck et al. | ............. | 701/123 |
| 6,304,194 B1 | 10/2001 | McKillip | .................... | 340/962 |
| 2005/0043934 A1* | 2/2005 | Hartmann et al. | ............. | 703/2 |
| 2005/0288895 A1* | 12/2005 | Petit | .......................... | 702/182 |

FOREIGN PATENT DOCUMENTS

EP 0 082 663 A2 * 6/1983

OTHER PUBLICATIONS

R.T. Marshall, et al.; "Modeling of Airplane Performance From Flight-Test Results and Validation with an F-104G Airplane," NASA Technical Note, Feb. 1973, XP008042719, Edwards, Cal, pp. 1-28.

* cited by examiner

*Primary Examiner*—Edward R Cosimano
(74) *Attorney, Agent, or Firm*—Dickinson Wright, PLLC

(57) ABSTRACT

An aircraft performance degradation detection system may include information sources, a central unit connected to the information sources, and a warning device that is connected to the central unit. Using information received from the information sources, the central unit computes the current weight and drag of the aircraft and computes a theoretical drag based on the current weight. The current and theoretical drags are compared, and a determination is made regarding performance degradation based on the comparison.

31 Claims, 2 Drawing Sheets

METHOD AND DEVICE FOR DETECTING DEGRADATION OF PERFORMANCE OF AN AIRCRAFT

FIELD OF THE INVENTION

The present invention relates to a method and a device for detecting degradation of performance of an aircraft.

BACKGROUND OF THE RELATED ART

It is known that, despite certification complying with the regulations, aircraft, in particular transport planes, may encounter situations which significantly degrade the aerodynamics, without the crew being aware thereof. Such a situation may give rise to a surprise effect which may be the cause of an unsuitable reaction from the crew, all the more so since, when the degradation of the aerodynamic performance becomes significant, the flight qualities are modified and the control of the aircraft becomes much more difficult.

The causes of degradation of performance that are best known are in particular icing, the absence of deicing on the ground of an iced-up airframe, snow, freezing rain, the application of deicing or anti-icing fluid, the picking up of insects on leading edges, the loss of a part of a leading edge or of a panel of the flying surface.

When an aircraft is confronted with one of the aforesaid situations causing a degradation of its performance, its resistance to progress through the air increases and the drag grows. In such a case, if the power is not modified, the aircraft loses speed while it is holding altitude, or the rate of climb drops when it is holding speed, which may of course become very dangerous and is not acceptable.

SUMMARY OF THE INVENTION

The present invention is aimed at aiding the crew in such situations that are liable to be dangerous. It relates to a method for detecting, simply, rapidly and accurately, a degradation of performance of an aircraft, in particular a degradation of performance which is due to conditions of severe icing of the aircraft.

For this purpose, said method is noteworthy according to the invention in that the following sequence of steps is carried out automatically and repetitively:

a) we compute at least:
   a current weight of the aircraft;
   on the basis of said current weight, a theoretical drag of said aircraft; and
   a current drag of said aircraft;
b) we implement at least a first set of comparisons, which relates to the drag and which comprises at least one comparison between said current drag and said theoretical drag; and
c) we determine whether a degradation of performance of the aircraft exists, at least on the basis of said first set of comparisons.

Advantageously, if a degradation of performance of the aircraft is detected in this step c), then at least one corresponding alert message is emitted in a next step d).

Thus, by virtue of the invention, it is possible to simply and rapidly detect a degradation of performance of an aircraft, by taking account of the values of drag, including a theoretical drag which is computed on the basis of the estimated weight of the aircraft, and to warn the crew upon such a detection.

The crew can then in full knowledge of the facts take all the necessary measures to remedy such a situation which is liable to be dangerous.

In a preferred embodiment, in step a):
said current weight of the aircraft is computed on the basis of the initial weight before the flight and of a consumption of fuel during the flight which depends at least on the altitude of the aircraft during the flight and on the type of said aircraft; and/or
said theoretical drag CXth is computed on the basis of the following expression:

$$CXth = f1(CZ^2) + f2(RE) + \Delta CXf$$

in which:
CZ is a value of drag dependent on the current weight of the aircraft;
$f1(CZ^2)$ is a function dependent on $CZ^2$;
$f2(RE)$ is a function dependent on the Reynolds number RE; and
$\Delta CXf$ is a value dependent on $CZ^2$ and CZ; and/or
said current drag CXa/c is computed on the basis of the following expression:

$$CXa/c = \frac{2 \cdot T}{R \cdot S \cdot TAS^2} - G$$

in which:
R is a constant value;
S represents the area of the flying surface of the aircraft;
TAS is a computed air speed;
G is a value dependent on TAS; and
T is a value of traction.

The present invention may be implemented regardless of the phase of flight of the aircraft. However, in a preferred embodiment, a check is performed to verify whether the aircraft is or is not in cruising flight, in particular by checking whether a standard mode of capture of altitude is engaged on said aircraft.

Advantageously, when, by virtue of the above check, it turns out that the aircraft is not in cruising flight, in step c), we determine whether a degradation of the performance of the aircraft exists, solely on the basis of said first set of comparisons relating to the drag.

In this case, advantageously, a degradation of performance of the aircraft is detected if one of the following two conditions A and B, relating to said first set of comparisons, is fulfilled:
condition A: CXa/c>CXth+$\Delta$CX1, for a predetermined duration;
condition B: CXa/c>CXth+$\Delta$CX2; and
$\Delta$CXa/c>$\Delta$CXth+$\Delta$CX3 for which:
CXa/c is the computed current drag of the aircraft;
CXth is the computed theoretical drag of the aircraft;
$\Delta$CX1, $\Delta$CX2 and $\Delta$CX3 are predetermined values of drag;
$\Delta$CX2 is for example equal to $\Delta$CX1;
$\Delta$CXa/c is a deviation of current drag between two different predetermined instants; and
$\Delta$CXth is a deviation of theoretical drag between two different predetermined instants.

Additionally, when, by virtue of the above check, it turns out that the aircraft is in cruising flight:

in step a), a theoretical cruising speed is computed on the basis of said current weight of the aircraft, and a current speed of the aircraft is measured;

in step b), a second set of comparisons is implemented, which relates to the speed and which comprises at least one comparison between said current speed and said theoretical cruising speed; and in step c), we determine whether a degradation of performance of the aircraft exists, likewise on the basis of said second set of comparisons relating to the speed, therefore on the basis of both said first and second sets of comparisons relating respectively to the drag and to the speed.

In this case, advantageously, in step a), said theoretical cruising speed is computed on the basis of the current weight of the aircraft, of a measured altitude of the aircraft and of a deviation of temperature between a standard temperature and a measured temperature.

Moreover, advantageously, in step c), a degradation of performance of the aircraft in cruising flight is detected if one of the following two conditions C and D, relating to said first and second sets of comparisons, is fulfilled:

condition C: $CXa/c > CXth + \Delta CX4$; and
$IAS < IASth - \Delta IAS1$, for a predetermined duration;
condition D: $CXa/c > CXth + \Delta CX4$; and
$IAS < IASth - \Delta IAS1$; and
$\Delta CXa/c > \Delta CXth + \Delta CX5$ for which, in addition to the aforementioned parameters:
$\Delta CX4$ and $\Delta CX5$ are predetermined values of drag;
IAS is the measured speed of the aircraft;
IASth is the computed theoretical cruising speed; and
$\Delta IAS1$ is a predetermined deviation in speed.

When neither of the aforesaid conditions C and D is fulfilled in cruising flight, advantageously, in step c), a degradation of performance of the aircraft is detected if one of the following two conditions E and F, relating to said first and second sets of comparisons, is fulfilled:

condition E: $CXa/c > CXth + \Delta CX6$; and
$IAS < IASth - \Delta IAS2$, for a predetermined duration;
condition F: $CXa/c > CXth + \Delta CX6$;
$IAS < IASth - \Delta IAS2$; and
$\Delta CXa/c > \Delta CXth + \Delta CX7$ for which, in addition to the aforementioned parameters:
$\Delta CX6$ and $\Delta CX7$ are predetermined values of drag;
$\Delta CX6$ is less than $\Delta CX4$;
$\Delta CX7$ is for example equal to $\Delta CX5$;
$\Delta IAS2$ is a predetermined deviation of speed; and
$\Delta IAS2$ is greater than $\Delta IAS1$.

Furthermore, advantageously, if none of the aforementioned conditions C, D, E and F is fulfilled in cruising flight, a check is performed to verify whether one of the two following conditions G and H, relating to said first and second sets of comparisons, is fulfilled:

condition G:
$CXa/c > CXth + \Delta CX8$; and
$IAS < IASth - \Delta IAS3$, for a predetermined duration,
condition H:
$CXa/c > CXth + \Delta CX8$;
$IAS < IASth - \Delta IAS3$; and
$\Delta CXa/c > \Delta CXth + \Delta CX9$, for which:
$\Delta CX8$ and $\Delta CX9$ are predetermined drag values, $\Delta CX8$ being less than $\Delta CX6$; and
$\Delta IAS3$ is a predetermined deviation of speed, which is less than $\Delta IAS1$ and than $\Delta IAS2$; and if one of said conditions G and H is fulfilled, a message indicating that the cruising speed is low is emitted in step d).

Additionally, in a particular embodiment, when a degradation of performance is detected, regardless of the flight phase:

a measured speed IAS (in particular the speed indicated by an anemometer) is compared with a computed minimum operational speed MSIS, relating to severe icing conditions; and if said speed IAS is less than said speed MSIS, a message requesting an increase in speed is emitted.

Furthermore, advantageously:

steps a) to c) mentioned above are carried out only if flaps and the landing gear of the aircraft are retracted; and/or steps b) and c) mentioned above are carried out only if at least one icing condition specified below is fulfilled and additionally if a measured static air temperature is greater than a predetermined value.

The present invention also relates to a device for detecting and warning of degradation of performance of an aircraft.

According to the invention, said device of the type comprising:

a set of information sources;

a central unit connected to said set of information sources and able to detect a degradation of performance of an aircraft; and warning means connected to said central unit, is noteworthy in that said central unit comprises:

means for computing at least one current weight of the aircraft, a current drag of said aircraft and, on the basis of said current weight, a theoretical drag of said aircraft;

means for implementing at least one first set of comparisons, which relates to the drag and which comprises at least one comparison between said current drag and said theoretical drag; and means for determining whether a degradation of performance of the aircraft exists, at least on the basis of said first set of comparisons.

Moreover, advantageously, said central unit furthermore comprises:

means for computing a theoretical cruising speed, on the basis of said current weight of the aircraft;

means for measuring a current speed of the aircraft;

means for carrying out a second set of comparisons, which relates to the speed and which comprises at least one comparison between said current speed and said theoretical cruising speed; and means for determining whether a degradation of performance of the aircraft exists, likewise on the basis of said second set of comparisons relating to the speed.

Additionally, in a preferred embodiment:

said set of information sources comprises a flight data acquisition unit, of FDAU type, which, in standard fashion, carries out the acquisition of data for a flight data logger, of FDR type ("Flight Data Recorder"); and/or said warning means, which are intended to warn the crew of a degradation of performance or of a low speed, comprise a aircraft performance interface unit of APIU type which, in standard fashion, carries out the management of the signaling, as well as the recording of messages in a flight data recorder of the aforesaid FDR type.

Said warning means may be of visual type and/or of audible type.

BRIEF DESCRIPTION OF THE DRAWINGS

The figures of the appended drawing will elucidate the manner in which the invention may be embodied. In these figures, identical references designate similar elements.

DETAILED DESCRIPTION OF THE INVENTION

Figure 1:
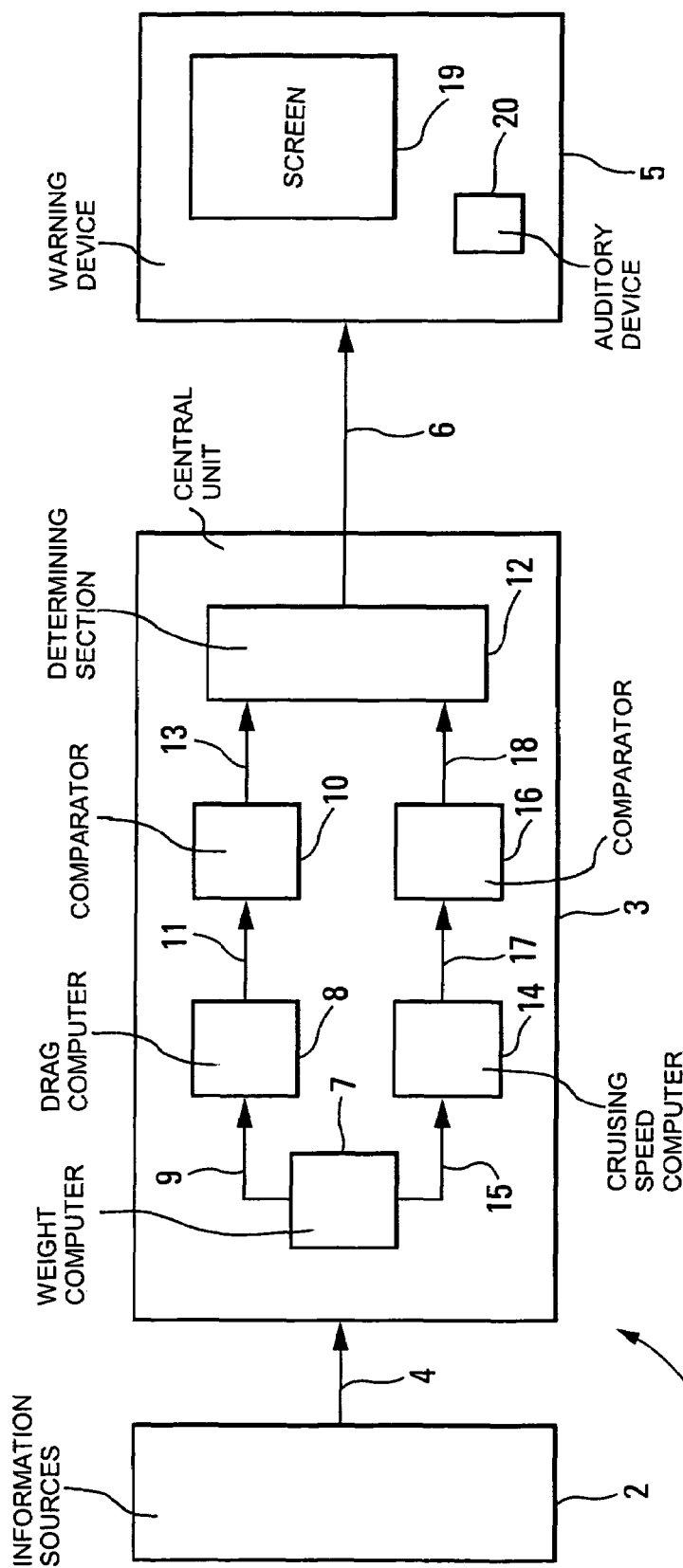
FIG. 1 is the schematic diagram of a device in accordance with the invention.

The device 1 in accordance with the invention and represented diagrammatically in FIG. 1 is a device for detecting and warning of degradation of performance of an aircraft (not represented), in particular of a transport plane. Although not exclusively, said device 1 is intended more especially for detecting a degradation of performance due to a problem of severe or excessive icing on the aircraft.

To do this, said device 1 which is carried on board the aircraft, is of the type comprising:
- a set 2 of the information sources;
- a central unit 3 connected by way of a link 4 to said set 2 of information sources and able to detect a degradation of performance of said aircraft; and
- warning means 5 which are connected by way of a link 6 to said central unit 3.

According to the invention, said central unit 3 comprises:
- means 7 for computing at least one current weight W of the aircraft;
- means 8 which are connected by way of a link 9 to said means 7, for computing a current drag CXa/c of said aircraft and, on the basis of said current weight W, a theoretical drag CXth of said aircraft;
- means 10 which are connected by way of a link 11 to said means 8, for implementing at least a first set of comparisons, which relates to the drag and which comprises at least one comparison between said current drag CXa/c and said theoretical drag CXth; and
- means 12 which are connected by way of a link 13 to said means 10, for determining whether a degradation of performance of the aircraft exists, at least on the basis of said first set of comparisons.

Thus, by virtue of the invention, said device 1 is able, on the one hand, to detect simply and rapidly a degradation of performance of an aircraft, by taking account of the values of drag CXa/c and CXth, of which the theoretical drag CXth is computed on the basis of the estimated weight W of the aircraft, and, on the other hand, to warn the crew upon such a detection, by way of said warning means 5.

In a particular embodiment, said means 7 computes said current weight W of the aircraft, on the basis of the initial weight W0 before the flight and of a consumption of fuel during the flight which depends at least on the altitude of the aircraft during said flight and on the type of said aircraft. This computation is carried out, for example each second, starting from the takeoff of the aircraft until its final landing. To do this, said initial weight W0 may be input by a crew member into the device 1, with the aid for example of an actuable rotator forming part of said set 2. As regards the consumption of fuel, it may be presented on an array, as a function of the altitude and possibly of the speed of the aircraft (unless taking account of a predetermined maximum speed for each of the various phases of flight), said array possibly being recorded directly in said means 7 or in a database (not represented) of said device 1.

Furthermore, said means 8 compute said theoretical drag CXth, on the basis of the following expression:

$$CXth = f1(CZ^2) + f2(RE) + \Delta CXf$$

in which:
- CZ is a value of drag specified below, dependent on the current weight W computed;
- $f1(CZ^2)$ is a function dependent on $CZ^2$;
- $f2(RE)$ is a function dependent on the Reynolds number RE; and
- $\Delta CXf$ is a value dependent on $CZ^2$ and CZ.

The functions $f1(CZ^2)$ and $f2(RE)$ may be presented in the form of arrays which may be defined empirically. Moreover:
said value CZ may be computed with the aid of the following expression:

$$CZ = \frac{2 \cdot W \cdot g}{\rho \cdot S \cdot TAS^2}$$

in which:
- g is the acceleration due to gravity;
- ρ is the density of the air;
- S is the area of the flying surface of the aircraft; and
- TAS is an air speed computed in a standard fashion; and
said value $\Delta CXf$ may be computed with the aid of the following expression:

$$\Delta CXf = A1.CZ^2 + A2.CZ + A3$$

with A1, A2 and A3 predetermined coefficients, defined for example empirically.

Additionally, said means 8 compute said current drag CXa/c on the basis of the following expression:

$$CXa/c = \frac{2 \cdot T}{R \cdot S \cdot TAS^2} - G$$

in which:
- R is a constant value (ideal gas constant);
- S represents the area of the flying surface of the aircraft;
- TAS is a computed air speed;
- G is a value dependent on TAS and on a geometric altitude Zg; and
- T is a value of traction.

The present invention may be implemented regardless of the phase of flight (climbing, cruising, descending) of the aircraft. However, this implementation depends on the phase of flight. As will be seen in greater detail hereinbelow, in the cruising phase, values of drag of the aircraft and speed values specified hereinbelow will be taken into account, whereas in the other phases of flight, only said values of drag will be taken into account.

Also, said central unit 3 moreover comprises:
- means 14, which are connected by way of a link 15 to said means 7, for computing a theoretical cruising speed IASth, on the basis of said current weight W of the aircraft;
- means which are for example integrated into the set 2, for measuring a current speed IAS of the aircraft; and
- means 16 which are connected by a link 17 to said means 14, for carrying out a second set of comparisons, which relates to the speed and which comprises at least one comparison between said current speed IAS and said theoretical cruising speed IASth.

Moreover, said means 12 which are aimed at determining whether a degradation of performance of the aircraft exists, may also take account (depending on the phase of flight) of said second set of comparisons relating to the speed, received by way of a link 18 from said means 16.

Said means 14 compute said theoretical cruising speed IASth on the basis of the current weight W of the aircraft, of a measured altitude Zp of the aircraft, and of a deviation of temperature $\Delta ISA$ between a standard temperature Tstd and a measured static air temperature SAT.

In a preferred embodiment, said means 14 use to do this the following expression:

$$IASth = a0 + a1.W + a2.W^2 + a3.\Delta ISA + a4.W.\Delta ISA + a5.\Delta ISA^2 + a6.Zp + a7.Zp.W + a8.Zp.\Delta ISA + a9.Zp^2$$

The parameters a0 to a9 are predetermined values dependant on the type of aircraft considered and defined for example empirically.

Additionally, the device 1 in accordance with the invention also comprises means forming for example part of the set 2, for checking whether the aircraft is or is not in cruising flight. For this purpose, these means check for example whether a standard mode of altitude capture is engaged on said aircraft, and this is done for a predetermined duration, for example from 2 minutes.

When, by virtue of the above check, it turns out that the aircraft is not in cruising flight (altitude capture mode not engaged or not engaged for the aforesaid predetermined duration), said means 12 determine whether a degradation of performance of the aircraft exists, solely on the basis of said first set of comparisons relating to the drag, received from said means 10.

In this case, said means 12 detect a degradation of performance of the aircraft if one of the following two conditions A and B relating to said first set of comparisons is fulfilled:

condition A: $CXa/c > CXth + \Delta CX1$, for a predetermined duration, for example 30 seconds;
condition B: $CXa/c > CXth + \Delta CX2$; and
$\Delta CXa/c > \Delta CXth + \Delta CX3$ for which:
CXa/c is the computed current drag of the aircraft;
CXth is thus the computed theoretical drag of the aircraft;
$\Delta CX1$, $\Delta CX2$ and $\Delta CX3$ are predetermined values of drag;
$\Delta CX2$ is equal to $\Delta CX1$;
$\Delta CXa/c$ is a deviation of current drag CXa/c between two different predetermined instants t1 and t2, for example the current instant t1 and a previous instant t2 corresponding to a predetermined duration (for example 30 seconds) before the current instant t1. Thus, $\Delta CXa/c = CXa/c(t1) - CXa/c(t2)$; and
$\Delta CXth$ is a deviation of theoretical drag CXth between two different aforementioned instants t1 and t2: $\Delta CXth = CXth(t1) - CXth(t2)$.

On the other hand, when, by virtue of the above check, it turns out that the aircraft is in cruising flight (altitude capture mode engaged), the means 12 determine whether a degradation of performance of the aircraft exists, likewise on the basis of said second set of comparisons relating to the speed, received from said means 16 (in addition to said first set of comparisons relating to the drag, received from said means 10).

In this case, said means 12 detect a degradation of performance of the aircraft if one of the following two conditions C and D, relating to said first and second sets of comparisons, is fulfilled:

condition C: $CXa/c > CXth + \Delta CX4$; and
$IAS < IASth - \Delta IAS1$, for a predetermined duration, for example 30 seconds;
condition D: $CXa/c > CXth + \Delta CX4$; and
$IAS < IASth - \Delta IAS1$; and
$\Delta CXa/c > \Delta CXth + \Delta CX5$ for which, in addition to the aforesaid parameters:
$\Delta CX4$ and $\Delta CX5$ are predetermined values of drag;
IAS is thus the measured current speed of the aircraft;
IASth is thus the computed theoretical cruising speed; and
$\Delta IAS1$ is a predetermined deviation in speed.

When neither of the aforesaid conditions C and D is fulfilled in cruising flight, said means 12 check conditions E and F and detect a degradation of performance of the aircraft if one of said following two conditions E and F relating to said first and second sets of comparisons is fulfilled:

condition E: $CXa/c > CXth + \Delta CX6$; and
$IAS < IASth - \Delta IAS2$, for a predetermined duration, for example 30 seconds;
condition F: $CXa/c > CXth + \Delta CX6$;
$IAS < IASth - \Delta IAS2$; and
$\Delta CXa/c > \Delta CXth + \Delta CX7$ for which, in addition to the aforesaid parameters:
$\Delta CX6$ and $\Delta CX7$ are predetermined values of drag;
$\Delta CX6$ is less than $\Delta CX4$;
$\Delta CX7$ is for example equal to $\Delta CX5$;
$\Delta IAS2$ is a predetermined deviation of speed;
$\Delta IAS2$ is greater than $\Delta IAS1$;

If, during one of the aforesaid checks, a degradation of performance of the aircraft is detected, said warning means 5 emit at least one appropriate corresponding alert message. To do this, said warning means 5 may comprise:
at least one viewing screen 19 for displaying alert messages; and/or
standard audible means 20, which are provided in the flight deck of the aircraft.

Additionally, if none of the conditions C, D E and F above is fulfilled in the cruising phase, said means 12 check whether one of the following conditions G and H is fulfilled:
condition G:
$CXa/c > CXth + \Delta CX8$; and
$IAS < IASth - IAS3$, for a predetermined time,
condition H:
$CXa/c > CXth + \Delta CX8$;
$IAS < IASth - \Delta IAS3$; and
$\Delta CXa/c > \Delta CXth + \Delta CX9$, in which:
$\Delta CX8$ and $\Delta CX9$ are predetermined drag values, $\Delta CX8$ being less than $\Delta CX6$; and
$\Delta IAS3$ is a predetermined deviation of speed, which is less than $\Delta IAS1$ and than $\Delta IAS2$; and
if one of said conditions G and H is fulfilled, said warning means 5 emit a message indicating that the cruising speed is low.

Additionally, in a particular embodiment, when the central unit 3 detects a degradation of performance:
it compares a measured speed IAS with a computed minimum operational speed MSIS, relating to severe icing conditions; and
if said speed IAS is less than said speed MSIS, said warning means 5 emit a message requesting an increase in speed.

Said speed MSIS is computed on the basis of the following expressions:

$$\begin{cases} MSIS = MIS + VO \\ MIS = K \cdot Vs \\ Vs = \left(\gamma \cdot R \cdot TO \cdot 5\{PO/P[(1 + 0.2 \cdot Ms^2)^{\gamma/\gamma-1} - 1] + 1\}^{(\gamma-1)/\gamma}\right)^{1/2} \\ Ms = [(W \cdot g)/(0.7 \cdot P \cdot S \cdot CZmax)]^{1/2} \end{cases}$$

in which, in addition to the aforesaid parameters:
VO is a predetermined speed value;
K is a predetermined coefficient;
R is the ideal gas constant;
TO is the standard temperature at sea level;
γ is a predetermined value;
P is the static pressure at the level of the aircraft;
PO is the static pressure at sea level; and
CZmax is a predetermined value.

In a particular embodiment:
said means 8 and 14 carry out the aforesaid computations, generally every second, only if flaps and the landing gear of the aircraft are retracted. Such a retraction is checked with the aid of standard means forming for example part of the set 2 of information sources; and
said means 10, 12 and 16 carry out the comparisons and the aforesaid processing operations, only if the static air temperature SAT measured is greater than a predetermined value, for example 5° C., and if one of the following icing conditions is fulfilled:
an accretion of ice has already been detected during the flight in progress;
a luminous icing indicator is lit;
a system for deicing the fuselage of the aircraft is operational.

Additionally, in a preferred embodiment:
said set 2 of information sources comprises a flight data acquisition unit, of FDAU type which, in standard fashion, carries out the acquisition of data for a flight data logger (not represented), of FDR type ("Flight Data Recorder"); and/or
said warning means 5 comprise an aircraft performance interface unit of APIU type which, in standard fashion, carries out the management of the signaling, as well as the recording of messages in a flight data recorder of the aforesaid FDR type.

Figure 2:
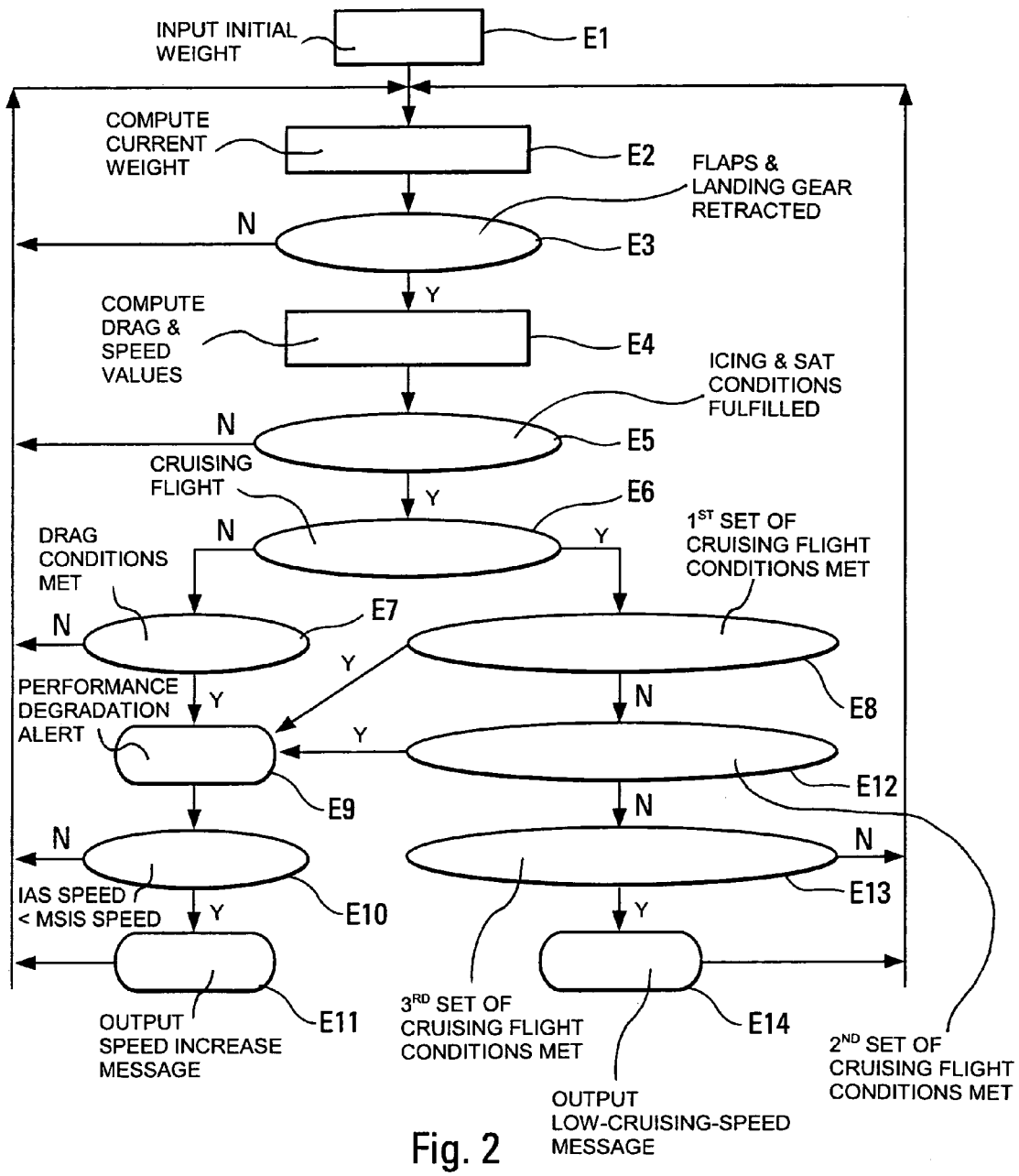
FIG. 2 is a chart showing the successive steps of a method implemented by the device in accordance with the invention.

The method implemented by the device 1 in accordance with the invention is presented hereinafter with reference to the chart of FIG. 2.

This method comprises:
a preliminary step E1 of inputting the initial weight WO into the device 1;
a computation step E2 for computing the current weight W (means 7);
a verification step E3 for checking whether the flaps and the landing gear of the aircraft are retracted. If the response is negative ("N" standing for "no"), we return to step E2, otherwise ("Y" for "yes"), we go to a computation step E4, then to a verification step E5;
said computation step E4 for computing:
the current drag CXa/c;
the theoretical drag CXth;
the deviation of current drag ΔCXa/c;
the deviation of theoretical drag ΔCXth;
the theoretical cruising speed IASth; and
the minimum operational speed MSIS;
said verification step E5 for checking whether at least one of the aforesaid icing conditions is fulfilled and whether a static air temperature SAT measured is greater than a predetermined value. If the response is negative, we return to step E2, otherwise we go to a verification step E6;
said verification step E6 for checking whether the aircraft is or is not in cruising flight:
if it is not, we go to a verification step E7; and
if it is, we go to a verification step E8;
said verification step E7 for checking whether the aforesaid conditions A and B are fulfilled:
if they are, we go to a step E9, then to a step E10; and
if they are not, we return to step E2;
said step E9 of emitting a message alerting the crew of a degradation of performance (warning means 5);
said step E10 of comparing the speed IAS with the speed MSIS. If the speed IAS is greater than or equal to the speed MSIS, we return to step E2, otherwise we go to a step E11;
said step E11 of emitting a message requesting an increase in speed (warning means 5);
said verification step E8 for checking in cruising flight whether the aforesaid conditions C and D are fulfilled:
if they are, we go to said step E9; and
if they are not, we go to a step E12;
said verification step E12 for checking in cruising flight whether the aforesaid conditions E and F are fulfilled:
if they are, we go to said step E9; and
if they are not, we go to a verification step E13;
said verification step E13 for checking in cruising flight whether either of the aforesaid conditions G or H is fulfilled:
if not, we return to said step E2; and
if so, we go to a step E14;
said step E14 of emitting a message indicating that the cruising speed is low (warning means 5).

I claim:

1. A method for detecting aircraft performance degradation comprising:
(a) receiving the initial weight of the aircraft from an external source;
(b) computing a current weight of the aircraft based on the received initial weight;
(c) computing the drag of the aircraft based on the computed current weight;
(d) computing a theoretical drag, CXth, of the aircraft based on the value of the computed drag and the square value of the computed drag
(e) comparing the computed theoretical drag to a current drag of the aircraft that is computed by a different formula;
(f) generating an indication of aircraft performance degradation based on the result of the comparison; and
(g) outputting said indication.

2. The method of claim 1, wherein the indication of aircraft performance degradation is an alert message.

3. The method of claim 1, wherein step (b) comprises computing the current weight of the aircraft on the basis of the aircraft's initial weight before the flight and the consumption of fuel during the flight, which depends on the altitude of the aircraft during the flight and on the type of aircraft.

4. The method of claim 1, wherein the current drag, CXa/c, of the aircraft is computed using the expression:

$$CXa/c = \frac{2 \cdot T}{R \cdot S \cdot TAS^2} - G$$

in which:
R is a constant value,
S represents the area of the flying surface of the aircraft,
TAS is a computed airspeed,
G is a value dependent on TAS, and
T is a value of traction.

5. The method of claim 1 further comprising, when a degradation of performance is detected:
  comparing a measured speed and a computed minimum operational speed relating to severe icing conditions; and
  emitting a message requesting an increase in speed if the measured speed is less than the computed minimum operational speed.

6. The method of claim 1 performed only when the flaps and landing gear of the aircraft are retracted.

7. The method of claim 1, wherein the comparison of the aircraft's computed theoretical drag and current drag and the indication of aircraft performance degradation is output only if at least one icing condition is fulfilled and if a measured static air temperature is greater than a predetermined value.

8. The method of claim 1, further comprising determining whether the aircraft is in cruising flight, and wherein said indication of aircraft performance degradation is determined, in response to the aircraft being determined not to be in cruising flight, solely on the basis of the comparison result.

9. The method of claim 8, wherein said indication of aircraft performance degradation is determined, in response to the aircraft being determined to be in cruising flight, based on whether one of the following two conditions A and B is fulfilled:
  condition A: $CXa/c > CXth + \Delta CX1$, for a predetermined duration, and
  condition B: $CXa/c > CXth + \Delta CX2$ and
    $\Delta CXa/c > \Delta CXth + \Delta CX3$
for which:
  CXa/c is a computed current drag of the aircraft,
  CXth is the computed theoretical drag of the aircraft,
  $\Delta CX1$, $\Delta CX2$, and $\Delta CX3$ are predetermined values of drag,
  $\Delta CXa/c$ is a deviation of computed current drag between two different predetermined instants, and
  $\Delta CXth$ is a deviation of computed theoretical drag between two different predetermined instants.

10. The method of claim 1 further comprising:
  determining whether the aircraft is in cruising flight; and
  in response to the aircraft being determined to be in cruising flight:
    computing a theoretical cruising speed based on the computed current weight of the aircraft;
    measuring a current speed of the aircraft;
    comparing the measured current speed and the computed theoretical cruising speed; and
    outputting the indication of aircraft performance degradation based on the comparisons of: (1) the computed theoretical drag to the computed current drag of the aircraft and (2) the measured current speed and the computed theoretical cruising speed.

11. The method of claim 10, wherein the theoretical cruising speed is computed on the basis of the computed current weight of the aircraft, a measured altitude of the aircraft, and the deviation between a standard temperature and a measured temperature.

12. The method of claim 10, wherein aircraft performance degradation is determined to exist if one of the following two conditions C and D is fulfilled:
  condition C: $CXa/c > CXth + \Delta CX4$ and
    $IAS < IASth - \Delta IAS1$, for a predetermined duration;
  condition D: $CXa/c > CXth + \Delta CX4$,
    $IAS < IASth - \Delta IAS1$, and
    $\Delta CXa/c > \Delta CXth + \Delta CX5$
for which:
  CXa/c is a computed current drag of the aircraft,
  CXth is the computed theoretical drag of the aircraft,
  $\Delta CX4$ and $\Delta CX5$ are predetermined values of drag,
  IAS is the measured current speed of the aircraft,
  IASth is the computed theoretical cruising speed,
  $\Delta IAS1$ is a predetermined deviation in speed,
  $\Delta CXa/c$ is a deviation in computed current drag between two different predetermined instants, and
  $\Delta CXth$ is a deviation in computed theoretical drag between two different predetermined instants.

13. The method of claim 12, wherein aircraft performance degradation is determined to exist if one of the following two conditions E and F is fulfilled:
  condition E: $CXa/c > CXth + \Delta CX6$ and
    $IAS < IASth - \Delta IAS2$, for a predetermined duration;
  condition F: $CXa/c > CXth + \Delta CX6$,
    $IAS < IASth - \Delta IAS2$, and
    $\Delta CXa/c > \Delta CXth + \Delta CX7$
for which:
  $\Delta CX6$ and $\Delta CX7$ are predetermined values of drag,
  $\Delta CX6$ is less than $\Delta CX4$,
  $\Delta IAS2$ is a predetermined deviation of speed, and $\Delta IAS2$ is greater than $\Delta IAS1$.

14. The method as claimed in claim 13, wherein if none of the conditions C, D, E, and F is fulfilled:
  a check is performed to verify whether one of the following two conditions G and H is fulfilled:
    condition G: $CXa/c > CXth + \Delta CX8$ and
      $IAS < IASth - \Delta IAS3$, for a predetermined duration,
    condition H: $CXa/c > CXth + \Delta CX8$,
      $IAS < IASth - \Delta IAS3$, and
      $\Delta CXa/c > \Delta CXth + \Delta CX9$,
  for which:
    $\Delta CX8$ and $\Delta CX9$ are predetermined drag values,
    $\Delta CX8$ being less than $\Delta CX6$, and
    $\Delta IAS3$ is a predetermined deviation of speed, which is less than $\Delta IAS1$ and $\Delta IAS2$; and
  if one of the conditions G and H is fulfilled, a message indicating that the cruising speed is low is emitted.

15. A method for detecting aircraft performance degradation comprising:
  receiving the initial weight of the aircraft from an external source;
  computing a current weight of the aircraft based on the received initial weight;
  computing a theoretical drag of the aircraft based on the computed current weight;
  computing the current drag, CXa/c, of the aircraft using the expression:

$CXa/c = 2.T/R.S.TAS^2 - G,$ in which:
  R is a constant value,
  S represents the area of the flying surface of the aircraft,
  TAS is a computed airspeed, G is a value dependent on TAS, and T is a value of traction;

comparing the computed theoretical drag to the computed current drag of the aircraft; and outputting an indication of aircraft performance degradation based on the result of the comparison.

16. The method of claim 15, wherein the indication of aircraft performance degradation is an alert message.

17. The method of claim 15, wherein the current weight of the aircraft is computed on the basis of the aircraft's initial weight before the flight and the consumption of fuel during the flight, which depends on the altitude of the aircraft during the flight and on the type of aircraft.

18. The method of claim 15 further comprising, when a degradation of performance is detected:

comparing a measured speed and a computed minimum operational speed relating to severe icing conditions; and emitting a message requesting an increase in speed if the measured speed is less than the computed minimum operational speed.

19. The method of claim 15 performed only when the flaps and landing gear of the aircraft are retracted.

20. The method of claim 15, wherein the comparison of the aircraft's computed theoretical drag and current drag and the indication of aircraft performance degradation is output only if at least one icing condition is fulfilled and if a measured static air temperature is greater than a predetermined value.

21. The method of claim 15, further comprising:

determining whether the aircraft is in cruising flight; and determining, if the aircraft is determined not to be in cruising flight, whether aircraft performance degradation exists solely on the basis of the comparison result.

22. The method of claim 21, wherein aircraft performance degradation is determined to exist, when the aircraft is determined not to be in cruising flight, if one of the following two conditions A and B is fulfilled:

condition A: CXa/c>CXth+$\Delta$CX1, for a predetermined duration;

condition B: CXa/c>CXth+$\Delta$CX2 and $\Delta$CXa/c>$\Delta$CXth+$\Delta$CX3 for which:

CXa/c is the computed current drag of the aircraft,

CXth is the computed theoretical drag of the aircraft, $\Delta$CX1, $\Delta$CX2, and $\Delta$CX3 are predetermined values of drag, $\Delta$CXa/c is a deviation of computed current drag between two different predetermined instants, and $\Delta$CXth is a deviation of computed theoretical drag between two different predetermined instants.

23. The method of claim 15 further comprising:

determining whether the aircraft is in cruising flight; and when the aircraft is in cruising flight:

computing a theoretical cruising speed based on the computed current weight of the aircraft;

measuring a current speed of the aircraft;

comparing the measured current speed and the computed theoretical cruising speed; and outputting the indication of aircraft performance degradation based on the comparisons of: (1) the computed theoretical drag to the computed current drag of the aircraft and (2) the measured current speed and the computed theoretical cruising speed.

24. The method of claim 23, wherein the theoretical cruising speed is computed on the basis of the computed current weight of the aircraft, a measured altitude of the aircraft, and the deviation between a standard temperature and a measured temperature.

25. The method of claim 23, wherein aircraft performance degradation is determined to exist if one of the following two conditions C and D is fulfilled:

condition C: CXa/c>CXth+$\Delta$CX4 and

IAS<IASth−$\Delta$IAS1, for a predetermined duration;

condition D: CXa/c>CXth+$\Delta$CX4,

IAS<IASth−$\Delta$IAS1, and $\Delta$CXa/c>$\Delta$CXth+$\Delta$CX5 for which:

CXa/c is the computed current drag of the aircraft,

CXth is the computed theoretical drag of the aircraft, $\Delta$CX4 and $\Delta$CX5 are predetermined values of drag, IAS is the measured current speed of the aircraft, IASth is the computed theoretical cruising speed, $\Delta$IAS1 is a predetermined deviation in speed, $\Delta$CXa/c is a deviation in computed current drag between two different predetermined instants, and $\Delta$CXth is a deviation in computed theoretical drag between two different predetermined instants.

26. The method of claim 25, wherein aircraft performance degradation is determined to exist if one of the following two conditions E and F is fulfilled:

condition E: CXa/c>CXth+$\Delta$CX6 and

IAS<IASth−$\Delta$IAS2, for a predetermined duration;

condition F: CXa/c>CXth+$\Delta$CX6,

IAS<IASth−$\Delta$IAS2, and $\Delta$CXa/c>$\Delta$CXth+$\Delta$CX7 for which:

$\Delta$CX6 and $\Delta$CX7 are predetermined values of drag, $\Delta$CX6 is less than $\Delta$CX4, $\Delta$IAS2 is a predetermined deviation of speed, and $\Delta$IAS2 is greater than $\Delta$IAS1.

27. The method as claimed in claim 26, wherein if none of the conditions C, D, E, and F is fulfilled:

a check is performed to verify whether one of the following two conditions G and H is fulfilled:

condition G: CXa/c>CXth+$\Delta$CX8 and

IAS<IASth−$\Delta$IAS3, for a predetermined duration, condition H: CXa/c>CXth+$\Delta$CX8, IAS<IASth−$\Delta$IAS3, and $\Delta$CXa/c>$\Delta$CXth+$\Delta$CX9, for which:

$\Delta$CX8 and $\Delta$CX9 are predetermined drag values, $\Delta$CX8 being less than $\Delta$CX6, and $\Delta$IAS3 is a predetermined deviation of speed, which is less than $\Delta$IAS1 and $\Delta$IAS2; and if one of the conditions G and H is fulfilled, a message indicating that the cruising speed is low is emitted.

28. A device for detecting aircraft performance degradation comprising:

a set of information sources;

a first computer that computes a current weight of the aircraft based on the initial weight of the aircraft obtained from the set of information sources;

a second computer that computes a value of aircraft drag based on the computed current weight and computes a theoretical drag, CXth, of the aircraft based on the computed value of drag and the square of the computed value of drag;

a first comparator that compares the computed theoretical drag to a current drag of the aircraft that is computed by a different formula; and a warning indicator that indicates aircraft performance degradation based on the result of the comparison.

29. The device of claim 28 further comprising:
a third computer that computes a theoretical cruising speed based on the computed current weight of the aircraft;
a measuring section that measures a current speed of the aircraft; and
a second comparator that compares the measured current speed and the computed theoretical cruising speed, wherein
the warning indicator indicates aircraft performance degradation based on the comparisons of: (1) the computed theoretical drag to the computed current drag of the aircraft and (2) the measured current speed and the computed theoretical cruising speed.

30. The device of claim 28, wherein the set of information sources comprises a flight data acquisition unit.

31. The device of claim 28, wherein the warning indicator comprises an aircraft performance interface unit.

* * * * *